US011915410B2

(12) United States Patent
Li et al.

(10) Patent No.: US 11,915,410 B2
(45) Date of Patent: Feb. 27, 2024

(54) METHOD AND APPARATUS FOR INSPECTING TAB APPEARANCE OF CELL ASSEMBLY, AND ELECTRONIC DEVICE

(71) Applicant: CONTEMPORARY AMPEREX TECHNOLOGY CO., LIMITED, Ningde (CN)

(72) Inventors: Lu Li, Ningde (CN); Zhiyu Wang, Ningde (CN); Guannan Jiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/138,501

(22) Filed: Apr. 24, 2023

(65) Prior Publication Data
US 2024/0029233 A1 Jan. 25, 2024

Related U.S. Application Data

(63) Continuation of application No. PCT/CN2022/107073, filed on Jul. 21, 2022.

(51) Int. Cl.
*G06T 3/60* (2006.01)
*G06T 5/20* (2006.01)
(Continued)

(52) U.S. Cl.
CPC .............. *G06T 7/0008* (2013.01); *G06T 3/60* (2013.01); *G06T 5/20* (2013.01); *G06T 7/13* (2017.01);
(Continued)

(58) Field of Classification Search
CPC ........... G06T 3/60; G06T 5/20; G06T 7/0008; G06T 7/13; G06T 2207/20164;
(Continued)

(56) References Cited

U.S. PATENT DOCUMENTS

2004/0038123 A1* 2/2004 Hisamitsu ......... H01M 10/0445
429/61
2010/0019335 A1* 1/2010 Ivanov .............. H01L 31/03529
977/932
(Continued)

FOREIGN PATENT DOCUMENTS

| CN | 101772852 B | * | 6/2013 | .......... H01M 2/0212 |
| CN | 107941805 A | * | 4/2018 | .......... G01B 11/028 |

(Continued)

OTHER PUBLICATIONS

Li et al. ("A new edge detection method based on contrast enhancement," International Conference on Future BioMedical Information Engineering; Date of Conference: Dec. 13-14, 2009) (Year: 2009).*

(Continued)

*Primary Examiner* — Yubin Hung
(74) *Attorney, Agent, or Firm* — XSENSUS LLP (57) ABSTRACT

A method and an apparatus for inspecting tab appearance of cell assembly, an electronic device, a non-transitory computer-readable storage medium, and a computer program product are provided. The method includes: obtaining an image for inspection that includes a background region and a cell assembly image region, where the cell assembly image region includes a body zone and a plurality of tab stacking regions, each tab stacking region adjoining a top edge or a bottom edge of the body zone; determining each root corner of the plurality of tab stacking regions in the image for inspection; determining two side edges of the body zone in the image for inspection; determining at least one reference edge line in the image for inspection based on the two side edges of the body zone in the image for inspection; and determining result information of the tab appearance inspection based on each root corner of the plurality of tab stacking
(Continued)

regions in the image for inspection and the at least one reference edge line.

20 Claims, 5 Drawing Sheets

(51) Int. Cl.
```
G06T 7/00      (2017.01)
G06T 7/13      (2017.01)
G06V 10/25     (2022.01)
G06V 10/28     (2022.01)
G06V 10/74     (2022.01)
G06V 10/75     (2022.01)
```
(52) U.S. Cl.
CPC .............. *G06V 10/25* (2022.01); *G06V 10/28* (2022.01); *G06V 10/751* (2022.01); *G06V 10/761* (2022.01); *G06T 2207/20164* (2013.01)

(58) Field of Classification Search
CPC ...... G06V 10/25; G06V 10/28; G06V 10/751; G06V 10/761
See application file for complete search history.

(56) References Cited

U.S. PATENT DOCUMENTS

| | | | | |
|---|---|---|---|---|
| 2011/0096900 A1* | 4/2011 | Park | ................... | G01N 23/083 |
| | | | | 378/51 |
| 2015/0037658 A1* | 2/2015 | Maeda | ............... | H01M 50/533 |
| | | | | 429/161 |

FOREIGN PATENT DOCUMENTS

| | | | |
|---|---|---|---|
| CN | 107941805 A | | 4/2018 |
| CN | 215142258 U | | 12/2021 |
| CN | 114609153 A | | 6/2022 |
| CN | 114764804 A | | 7/2022 |
| CN | 115035050 A | * | 9/2022 |
| CN | 115829921 A | * | 3/2023 |
| KR | 20160087600 A | | 7/2016 |
| KR | 101981010 B1 | * | 8/2019 |

OTHER PUBLICATIONS

Contemporary Amperex Technology Co., Limited, PCT/CN2022/107073, International Search Report, dated Mar. 4, 2023, 5 pgs.

* cited by examiner

METHOD AND APPARATUS FOR INSPECTING TAB APPEARANCE OF CELL ASSEMBLY, AND ELECTRONIC DEVICE

CROSS-REFERENCE TO RELATED APPLICATIONS

The present application is a continuation of PCT Patent Application No. PCT/CN2022/107073, entitled "METHOD AND APPARATUS FOR INSPECTING TAB APPEARANCE OF CELL ASSEMBLY, AND ELECTRONIC DEVICE" filed on Jul. 21, 2022, which is incorporated herein by reference in its entirety.

TECHNICAL FIELD

This disclosure relates to the field of battery production technologies, and in particular, to a method and an apparatus for inspecting tab appearance of cell assembly, an electronic device, a non-transitory computer-readable storage medium, and a computer program product.

BACKGROUND

In the related art, a rechargeable battery (or secondary battery, hereinafter referred to as "battery", which is a battery that can be reused by activating its active substances through charging after the battery discharges) includes a battery box and a plurality of battery cells connected in series and/or parallel in the battery box. A battery cell is the smallest power source unit in a battery, and a cell assembly is a key part for chemical reaction in a battery cell, so detecting defects on tab appearance of the cell assembly is an important step of battery production.

SUMMARY

This disclosure is intended to resolve at least one of the technical problems in the related art. To that end, one of the purposes of this disclosure is to provide a method and an apparatus for inspecting tab appearance of cell assembly, an electronic device, a non-transitory computer-readable storage medium, and a computer program product.

Embodiments of a first aspect of this disclosure provide a method for inspecting tab appearance of cell assembly, including: obtaining an image for inspection that includes a background region and a cell assembly image region, where the cell assembly image region includes a body zone and a plurality of tab stacking regions, each tab stacking region adjoining a top edge or a bottom edge of the body zone; determining each root corner of the plurality of tab stacking regions in the image for inspection; determining two side edges of the body zone in the image for inspection; determining at least one reference edge line in the image for inspection based on the two side edges of the body zone in the image for inspection; and determining result information of the tab appearance inspection based on each root corner of the plurality of tab stacking regions in the image for inspection and the at least one reference edge line.

In the method according to the embodiments of this disclosure, appearance of stacked tabs of a cell assembly is detected based on an image of the cell assembly by using computer vision technology. Compared with manual measurement or inspection using a special gauge in the related art, this method is efficient in inspection and workable for a wide range of product specifications, and can also significantly enhance inspection accuracy, thus raising the quality product rates of cell assemblies and batteries.

In some embodiments, the obtaining an image for inspection includes: performing binarization processing on the image for inspection to obtain a binarized image, where the cell assembly image region is used as a region of interest of the binarized image. Performing binarization processing on the image for inspection facilitates correct extraction of the cell assembly image region in subsequent steps.

In some embodiments, the determining each root corner of the plurality of tab stacking regions in the image for inspection includes: in the binarized image, performing matching and positioning on a corresponding template image in each local search region based on a template image and a local search region that are correspondingly configured for each root corner; and determining each root corner of the plurality of tab stacking regions in the binarized image based on a matching and positioning result for the template image in each local search region.

In some embodiments, the template image is obtained based on a cell assembly image template.

The local search region is a small search region preset for the binarized image. Matching and positioning on the template image in the local search region can significantly reduce workload of matching computation and improve speed and accuracy of matching computation.

In some embodiments, the determining two side edges of the body zone in the image for inspection includes: extracting the cell assembly image region from the binarized image; scrolling the cell assembly image region in the binarized image by one pixel column in a row direction to obtain a contrast image; determining a plurality of edge pixels of the cell assembly image region in the binarized image based on a gray level difference between the binarized image and the contrast image; and filtering out edge pixels that are arranged in a first direction but have a spacing less than a distance threshold from the plurality of edge pixels to obtain the two side edges of the body zone in the binarized image, where the first direction essentially extends in a same direction as the top edge and bottom edge of the body zone.

The solution of this embodiment can not only filter out edge pixels irrelevant to the two side edges of the body zone, but also best avoid image feature missing or errors caused by poor hardware or shooting environment, thereby further enhancing inspection accuracy.

In some embodiments, the determining at least one reference edge line in the image for inspection based on the two side edges of the body zone in the image for inspection includes: separately performing linear fitting on the two side edges of the body zone in the binarized image to obtain two fitted side edges that extend linearly; and determining at least one reference edge line in the binarized image based on the two fitted side edges. Determining the reference edge line based on the fitted side edges obtained by linear fitting can further enhance inspection accuracy.

In some embodiments, the extracting the cell assembly image region from the binarized image includes: extracting the cell assembly image region from the binarized image based on at least one of a threshold segmentation algorithm, an image segmentation algorithm, and a maximum connected component algorithm.

In some embodiments, the obtaining an image for inspection includes: performing rotation correction on the image for inspection so that the top edge and bottom edge of the body zone are basically parallel to a row direction and the two side edges of the body zone are basically orthogonal to the row direction.

In some embodiments, shooting exposure time for the image for inspection is not less than 8,000 microseconds and not greater than 12,000 microseconds. In a better-exposed image for inspection, the gray level of the cell assembly image region is obviously different from that of the background region, further enhancing inspection accuracy.

In some embodiments, the result information of tab appearance inspection includes: distance between two root corners in each tab stacking region; and/or pass or fail assessment result for tab appearance.

In some embodiments, the cell assembly image region includes two tab stacking regions: a positive tab stacking region and a negative tab stacking region, where both the positive tab stacking region and the negative tab stacking region adjoin the top edge or bottom edge of the body zone, or the positive tab stacking region adjoins the top edge of the body zone and the negative tab stacking region adjoins the bottom edge of the body zone.

Embodiments of a second aspect of this disclosure provide an apparatus for inspecting tab appearance of cell assembly. The apparatus includes: an obtaining unit, configured to obtain an image for inspection that includes a background region and a cell assembly image region, where the cell assembly image region includes a body zone and a plurality of tab stacking regions, each tab stacking region adjoining a top edge or a bottom edge of the body zone; a first determining unit, configured to determine each root corner of the plurality of tab stacking regions in the image for inspection; a second determining unit, configured to determine two side edges of the body zone in the image for inspection; a third determining unit, configured to determine at least one reference edge line in the image for inspection based on the two side edges of the body zone in the image for inspection; and a fourth determining unit, configured to determine result information of tab appearance inspection based on each root corner of the plurality of tab stacking regions in the image for inspection and the at least one reference edge line.

Embodiments of a third aspect of this disclosure provide a non-transitory computer-readable storage medium storing computer instruction, where the computer instructions are used to enable a computer to perform the method in the foregoing aspect.

Embodiments of a third aspect of this disclosure provide a computer program product that includes a computer program, where when the computer program is executed by a processor, the method in the foregoing aspect is implemented.

Using the foregoing embodiments of this disclosure to detect appearance of stacked tabs of cell assemblies is efficient in inspection and workable for a wide range of product specifications, and can also significantly enhance inspection accuracy, thus raising the quality product rates of cell assemblies and batteries.

The foregoing descriptions are merely an overview of the technical solutions in this disclosure. In order to better understand the technical means in this disclosure, to achieve implementation according to content of the specification, and to make the above and other objects, features and advantages in this disclosure more obvious and easy to understand, the following describes specific embodiments of this disclosure.

BRIEF DESCRIPTION OF DRAWINGS

In the accompanying drawings, unless otherwise specified, same reference signs in a plurality of drawings indicate the same or similar parts or elements. These accompanying drawings may not necessarily drawn in proportion. It should be understood that these accompanying drawings only depict some embodiments disclosed in this disclosure and should not be regarded as a limitation on the scope of this disclosure.

REFERENCE SIGNS ARE DESCRIBED AS FOLLOWS

100: cell assembly
10: body portion
101: negative electrode plate
11: negative tab
102: positive electrode plate
12: positive tab
103: separator
2000: image for inspection
201: background region
202: cell assembly image region
20: body zone
21: negative electrode stacking region
22: positive electrode stacking region
230: binarized image
231: local search region
232: template image

DESCRIPTION OF EMBODIMENTS

The following describes in detail the embodiments of technical solutions of this disclosure with reference to the accompanying drawings. The following embodiments are merely used to describe technical solutions of this disclosure more explicitly, and therefore they are merely used as examples and do not constitute a limitation to the protection scope of this disclosure.

Unless otherwise defined, all technical and scientific terms used herein shall have the same meanings as commonly understood by those skilled in the art to which this disclosure belongs. The terms used herein are merely intended to describe the specific embodiments but not intended to constitute any limitation on this disclosure. The terms "include", "comprise", and "having" and any other variations thereof in the specification, the claims and the foregoing brief description of drawings of this disclosure are intended to cover a non-exclusive inclusion.

In descriptions of embodiments of this disclosure, the terms "first", "second" and the like are merely intended to distinguish between different objects, and shall not be understood as an indication or implication of relative importance or implicit indication of the number, specific sequence or dominant-subordinate relationship of indicated technical features. In the descriptions of embodiments of this disclosure, "a plurality of" means at least two unless otherwise specifically stated.

The term "embodiment" described herein means that specific features, structures or characteristics in combination with descriptions of the embodiments may be incorporated in at least one embodiment of this disclosure. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with another embodiments.

In the descriptions of embodiments of this disclosure, the term "and/or" describes only an association relationship for describing associated objects and represents that three relationships may exist. For example, A and/or B may represent the following three cases: A alone, both A and B, and B alone. In addition, a character "/" in this specification generally indicates an "or" relationship between contextually associated objects.

In the descriptions of the embodiments of this disclosure, term "a plurality of" means two (inclusive) or more. Similarly, "a plurality of groups" means two (inclusive) or more groups, and "a plurality of pieces" means two (inclusive) or more pieces.

In the descriptions of the embodiments of this disclosure, the orientations or positional relationships indicated by the technical terms "center", "column direction", "row direction", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to help the descriptions of the embodiments of this disclosure and simplify the descriptions, are not intended to indicate or imply that the apparatuses or components mentioned in this disclosure must have specific orientations, or be constructed and operated for a specific orientation, and therefore shall not be construed as a limitation to embodiments of this disclosure.

In the descriptions of embodiments of this disclosure, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this disclosure based on specific situations.

Common cell assemblies mainly fall into laminated cell assembly and wound cell assembly. A laminated cell assembly includes a plurality of positive electrode plates and a plurality of negative electrode plates that are alternately stacked, as well as separators provided between any adjacent positive electrode plate and negative electrode plate. A wound cell assembly includes a positive electrode plate and a negative electrode plate that are stacked and then wound together, as well as a separator between the positive electrode plate and the negative electrode plate. Using a lithium-ion battery cell as an example, inside the housing of the battery cell, a cell assembly is soaked in electrolyte, and lithium-ions move between the negative electrode and positive electrode, so as to charge and discharge the battery cell. A separator is to allow lithium-ions to pass freely and stop electrons from passing, thus avoiding short circuit caused by electrolyte passing through the negative electrode and positive electrode in the battery cell.

Figure 1A:
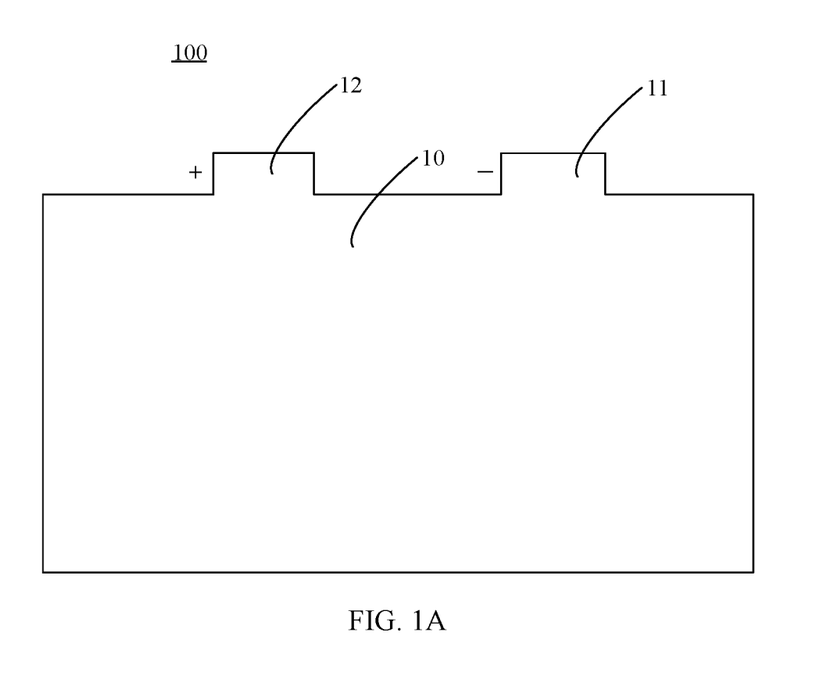
FIG. 1A is a front view of a simplified structure of a wound cell assembly.
Figure 1B:
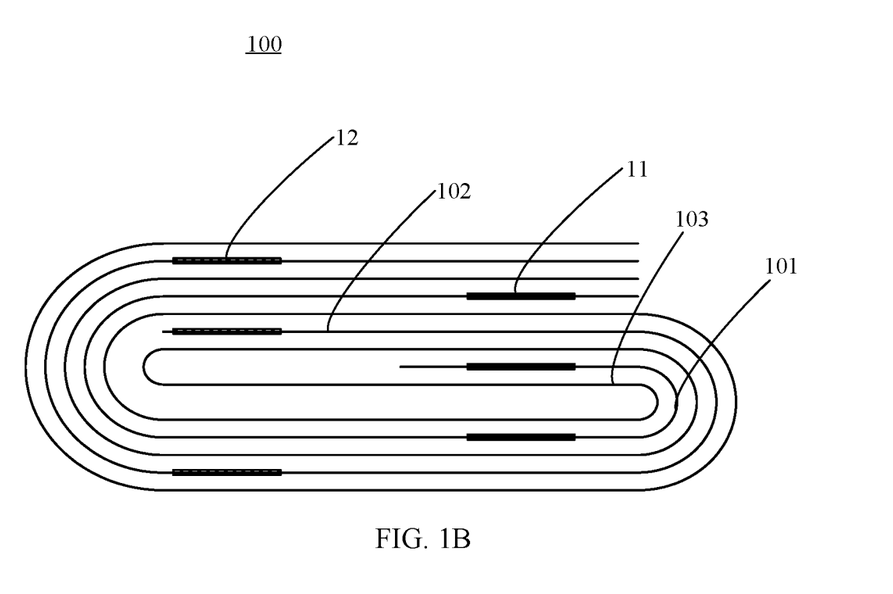
FIG. 1B is a top view of a simplified structure of a wound cell assembly.

FIG. 1A is a front view of a simplified structure of a wound cell assembly, and FIG. 1B is a top view of a simplified structure of the cell assembly. As shown in FIG. 1A and FIG. 1B, the cell assembly 100 includes a negative electrode plate 101 and a positive electrode plate 102 that are stacked and then wound together, as well as a separator 103 between the negative electrode plate 101 and the positive electrode plate 102. The negative electrode plate 101 includes a negative electrode plate body (not shown in the figures) provided with an active substance and a plurality of negative tabs 11 not provided with an active substance layer. The plurality of negative tabs 11 are spaced along one side edge of the negative electrode plate body and are stacked together after winding, thus serving as the negative electrode of the cell assembly 100. The positive electrode plate 102 includes a positive electrode plate body (not shown in the figures) provided with an active substance and a plurality of positive tabs 12 not provided with an active substance layer. The plurality of positive tabs 12 are spaced along one side edge of the positive electrode plate body and are stacked together after winding, thus serving as the positive electrode of the cell assembly 100.

In the production process of cell assembly, for environmental, technical or equipment reasons, cell assemblies may bear all kinds of defects. Therefore, it is necessary to detect defects in the cell assemblies, so as to guarantee the quality product rate. Defect detection on tab appearance is a vital step. The validity of inspection results directly affects the safety of batteries delivered. In the embodiments of this disclosure, defect detection on tab appearance mainly refers to appearance inspection on a plurality of stacked negative tabs and a plurality of stacked positive tabs of a wound cell assembly, so as to determine whether the overall size of the stacked tabs meets the design requirement or not.

Based on the foregoing consideration and in-depth research, the inventors have provided a method and an apparatus for inspecting tab appearance of cell assembly, an electronic device, a non-transitory computer-readable storage medium, and a computer program product, so as to enhance tab appearance inspection accuracy, thereby improving the quality product rates of cell assemblies and batteries.

In the solutions of the embodiments of this disclosure, appearance of stacked tabs of a cell assembly is detected based on an image of the cell assembly by using computer vision technology. First, each root corner of a tab stacking region in an image for inspection is determined; then, two side edges of a body zone of a cell assembly image region in the image for inspection is determined; after that, a reference edge line in the image for inspection is determined based on the two side edges; in the end, result information of tab appearance inspection is obtained based on a relative position relationship between the root corners of the tab stacking region and the reference edge lines. The tab stacking region reflects an overall appearance of a plurality of tabs after stacking. Each tab stacking region includes two root corners. If distance between the two root corners is overlong, the tabs are seriously misaligned after stacking, and review of product design and techniques is required. The technical solutions of the embodiments of this disclosure can be used to perform appearance inspection on stacked tabs of a cell assembly after the cell assembly is produced, so as to identify relevant defects in a timely manner. The inspection accuracy is high, and therefore quality product rates of cell assemblies and batteries can be improved.

The battery disclosed in the embodiments of this disclosure may be a traction battery or an energy storage battery. Application scenarios for the traction battery include but are not limited to vehicles, ships, aircrafts, spacecrafts, electric tools, electric toys, and various mobile terminals. Application scenarios for the energy storage battery include but are not limited to solar power generation systems, hydroelectric power generation systems, and wind power generation systems.

Figure 2:
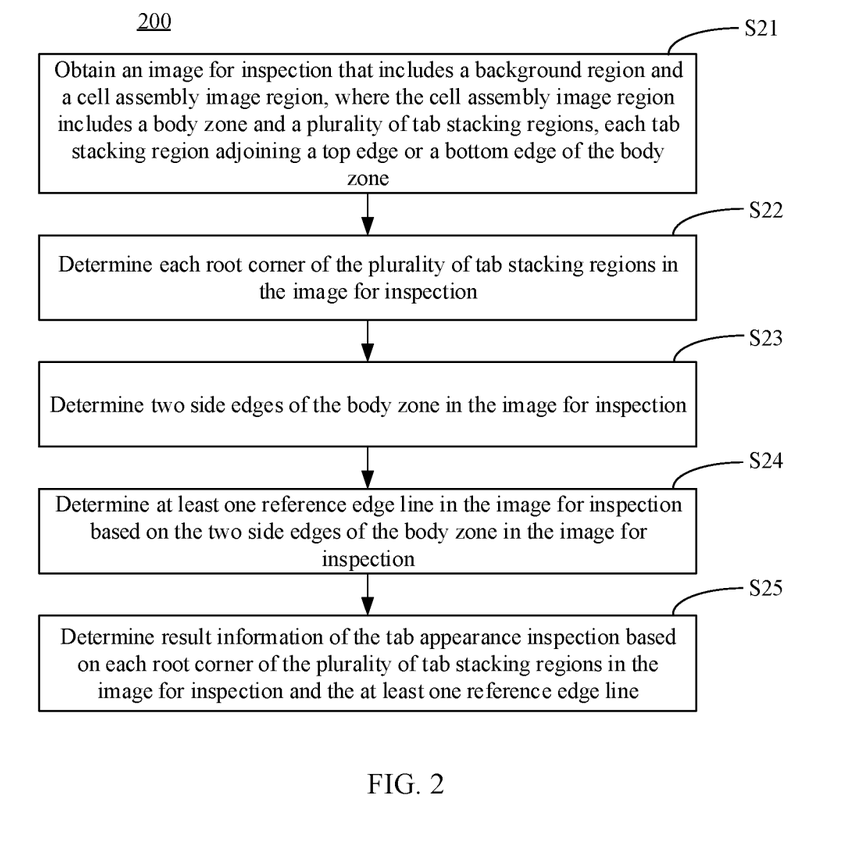
FIG. 2 is a schematic flowchart of a method for inspecting tab appearance of cell assembly according to some embodiments of this disclosure.
Figure 3:
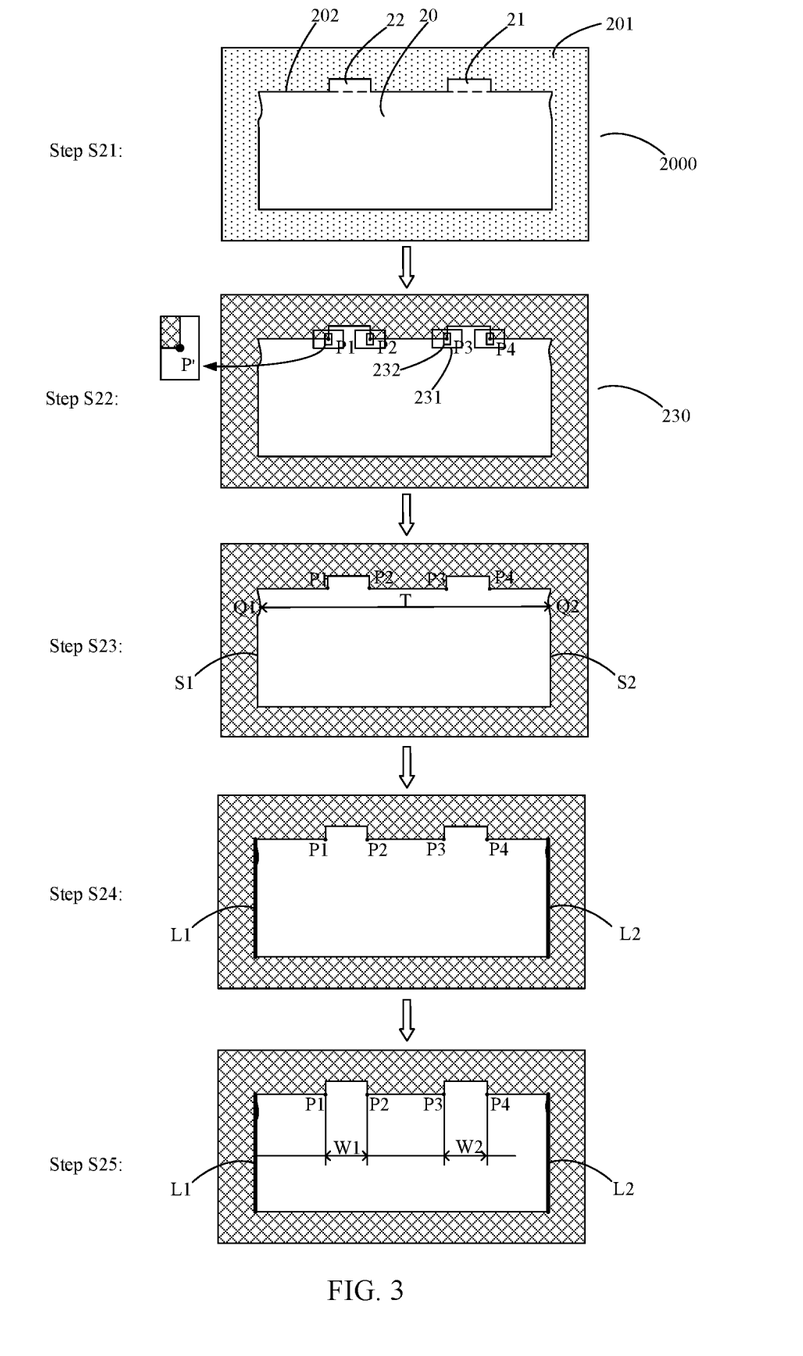
FIG. 3 is a schematic flowchart of a method for inspecting tab appearance of cell assembly according to some embodiments of this disclosure.

As shown in FIG. 2 and FIG. 3, a method 200 for inspecting tab appearance of cell assembly provided in an embodiment of this disclosure includes the following steps S21 to S25.

In step S21, an image for inspection 2000 including a background region 201 and a cell assembly image region 202 is obtained, where the cell assembly image region 202 includes a body zone 20 and a plurality of tab stacking regions (such as a negative tab stacking region 21 and a positive tab stacking region 22 shown in the figure), each tab stacking region adjoining a top edge or a bottom edge of the body zone 20.

In step S22, each root corner (such as root corners P1, P2, P3, and P4 shown in the figure) of a plurality of tab stacking regions in the image for inspection is determined.

In step S23, two side edges (such as side edges S1 and S2 shown in the figure) of the body zone 20 in the image for inspection are determined.

In step S24, at least one reference edge line (such as reference edge lines L1 and L2 shown in the figure) in the image for inspection is determined based on the two side edges of the body zone 20 in the image for inspection.

In step S25, result information of tab appearance inspection is determined based on each root corner of the plurality of tab stacking regions in the image for inspection and the at least one reference edge line (inspection result information includes, for example, distances W1 and W2 shown in the figure).

The embodiments of this disclosure can be used for appearance inspection on stacked tabs of many kinds of cell assembly products. As shown in FIG. 1A and FIG. 1B, in some embodiments, the cell assembly 100 is a wound cell assembly and includes a body portion a plurality of positive tabs 12 (serving as the positive electrode of the cell assembly) stacked at the top end of the body portion 10, and a plurality of negative tabs 11 (serving as the negative electrode of the cell assembly) stacked at the top end of the body portion 10. As shown in FIG. 3, the image for inspection 2000 obtained by shooting the cell assembly 100 includes the background region 201 and the cell assembly image region 202, where the cell assembly image region 202 includes the positive tab stacking region 22 and the negative tab stacking region 21. Both the positive tab stacking region 22 and the negative tab stacking region 21 adjoin the top edge of the body zone 20 (or adjoin the bottom edge of the body zone, depending on the placement of the cell assembly).

In some other embodiments, the cell assembly is a wound cell assembly, and its structure may be designed to include a body portion, a plurality of positive tabs (serving as the positive electrode of the cell assembly) stacked at the top end of the body portion, and a plurality of negative tabs (serving as the negative electrode of the cell assembly) stacked at the bottom of the body portion. The image for inspection obtained by shooting the cell assembly includes a background region and a cell assembly image region. The cell assembly image region includes a positive tab stacking region and a negative tab stacking region, where the positive tab stacking region adjoins the top edge of the body zone (or adjoins the bottom edge of the body zone, depending on the placement of the cell assembly), and the negative tab stacking region adjoins the bottom edge of the body zone (or adjoins the top edge of the body zone, depending on the placement of the cell assembly).

In the method 200 of this embodiment of this disclosure, appearance of stacked tabs of a cell assembly is detected based on an image of the cell assembly by using computer vision technology. Compared with manual measurement or inspection using a special gauge in the related art, this method is efficient in inspection and workable for a wide range of product specifications, and can also significantly enhance inspection accuracy, thus raising the quality product rates of cell assemblies and batteries.

The result information of tab appearance inspection may include, for example, distance between two root corners in each tab stacking region (namely distances W1 and W2 shown in FIG. 3); and/or pass or fail assessment result for tab appearance.

In some embodiments, when distance between two root corners of a tab stacking region is greater than a distance threshold, the tab appearance can be determined to be not qualified. In this way, the defective cell assembly can be identified in time and prevented from being forwarded to subsequent production steps, thereby improving the quality product rates of cell assemblies and batteries.

In some embodiments, how well the cell assembly is assembled can also evaluated based on the distance between two root corners of the tab stacking region. For example, if the distance between two root corners of the tab stacking region exceeds a distance threshold, the electrode plate is wound too loosely or tightly, resulting in serious misalignment of tabs after stacking. Relevant review of product design and techniques can be conducted on such basis.

The image for inspection in step S21 can be obtained by shooting the cell assembly using an industrial camera or other image acquisition devices. In some embodiments, when the shooting environment is not bright enough, the aperture of the image acquisition device may be set to the largest and the shooting exposure time is set to be not less than 8,000 microseconds and not greater than 12,000 microseconds, so as to obtain a highly exposed image for inspection with the gray levels of the cell assembly image region and background region clearly different.

In some embodiments of this disclosure, the image acquisition device and the cell assembly can be accurately positioned prior to shooting, and then the image acquisition device is started to shoot the cell assembly, so that the top edge and bottom edge of the body zone in the image for inspection are directly made basically parallel to a row direction (the pixel row direction in the image) and the two side edges are made basically orthogonal to the row direction (the pixel column direction in the image).

In some other embodiments of this disclosure, the requirement for shooting positioning accuracy of the image acquisition device and cell assembly is not high. Rotation correction can be performed on the image for inspection obtained after the image for inspection is captured. In the embodiment, the foregoing step S21 includes: performing rotation correction on the image for inspection so that the top edge and bottom edge of the body zone are basically parallel to a row direction (the pixel row direction in the image) and the two side edges are basically orthogonal to the row direction (the pixel column direction in the image)

In the embodiments of this disclosure, a "row direction" and "column direction" are relative directions rather than an absolute row direction or column direction. The terms "basically parallel" and "basically orthogonal" can be understood as being parallel or orthogonal within a given error range, not being absolutely parallel or orthogonal.

Notably, in the embodiments of this disclosure, even if the top edge and bottom edge of the body zone are not parallel to the row direction, the foregoing method 200 still applies and still can obtain relatively accurate inspection result information. The reason is that in step S25, the result information of tab appearance inspection is determined based on a relative position relationship between the root corners of the tab stacking regions in the image for inspection and the reference edge line, and the inspection result information is nearly not affected by the relative position of the body zone in the image for inspection.

In some embodiments of this disclosure, as shown in FIG. 3, the foregoing step S21 includes: performing binarization processing on the image for inspection 2000 to obtain a binarized image 230, where the cell assembly image region 202 is used as a region of interest of the binarized image 230.

Binarization of an image means that a gray level of pixels in an image is set to 0 or 255 based on a specified gray level threshold, so that the whole image demonstrates only two obvious visual effects: black and white (in FIG. 3, the background region of the binarized image 230 has a gray level of 0 and is shaded). In the binarized image 230 obtained through binarization processing, the cell assembly image region 202 is used as a region of interest. Performing binarization processing on the image for inspection facilitates correct extraction of the cell assembly image region 202 in subsequent steps.

In some embodiments, as shown in FIG. 3, the foregoing step S22 includes: in the binarized image 230, performing matching and positioning on a corresponding template image 232 in each local search region 231 based on a template image 232 and a local search region 231 that are correspondingly configured for each root corner; and determining each root corner (such as root corners P1, P2, P3, and P4 shown in the figure) of the plurality of tab stacking regions in the binarized image 230 based on a matching and positioning result for the template image 232 in each local search region 231.

The template image 232 may be obtained based on a cell assembly image template. The cell assembly image template refers to a standard image of cell assembly used as a reference. The template image 232 is a part taken from the cell assembly image template, includes the root corner P', and can be used as a reference for image feature matching and comparison. For ease of computation, the root corner P' in the template image 232 may be set at the center of the template image.

The local search region 231 is a small search region preset for the binarized image 230. Matching and positioning on the template image 232 in the local search region 231 can significantly reduce workload of matching computation and improve speed and accuracy of matching computation.

After a matching image corresponding to the template image 232 is found in the local search region 231 (for example, feature similarity between the template image and the matching image is higher than a specified similarity threshold), the root corner in the local search region 231 can be determined based on a matching and positioning result for the template image 232 in the local search region 231 (for example, pixel coordinates of one corner in the template image 232) through coordinate migration. In this way, the pixel coordinates of root corners in the local search region 231 are determined.

In some embodiments, the foregoing step S23 includes the following sub-step 1 to sub-step 4.

In sub-step 1, the cell assembly image region is extracted from the binarized image. For example, the cell assembly image region may be extracted from the binarized image based on at least one of a threshold segmentation algorithm, an image segmentation algorithm, and a maximum connected component algorithm.

In sub-step 2, the cell assembly image region is scrolled (or translated) in the binarized image by one pixel column along a row direction to obtain a contrast image.

In sub-step 3, a plurality of edge pixels of the cell assembly image region in the binarized image are determined based on a gray level difference between the binarized image and the contrast image (the edge pixels in the binarized image and contrast image differ by 255 or −255 in gray level).

In sub-step 4, edge pixels (such as pixels at points Q1 and Q2 in FIG. 3; actually, such pixels can be a plurality of pairs of pixels arranged in a first direction) that are arranged in a first direction but have a spacing T less than a distance threshold are filtered out from the plurality of edge pixels to obtain the two side edges of the body zone (which may be discontinuous), where the first direction essentially extends in a same direction as the top edge and bottom edge of the body zone (error within a given range is acceptable).

The distance threshold in the first direction may be determined based on the distance between the two side edges of the body zone in the cell assembly image template, for example, may be equal to or shorter than the distance of the two side edges. According to the solution of this embodiment, edge pixels irrelevant to the two side edges of the body zone (such as edge pixels in the tab stacking region) can be filtered out, and image feature missing or errors caused by poor hardware or shooting environment can be best avoided, thereby further enhancing inspection accuracy.

As shown in FIG. 3, in some embodiments, the foregoing step S24 includes: separately performing linear fitting on the two side edges S1 and S2 of the body zone 20 in the binarized image 230 (for example, using the Ransac algorithm) to obtain two fitted side edges that extend linearly; and determining at least one reference edge line (such as the reference edge lines L1 and L2 shown in the figure) in the binarized image based on the two fitted side edges.

The Ransac algorithm is an iterative algorithm for random parameter estimation. Its basic principle is as follows: First, two random points on a side edge are selected and this data set is used to work out a data model; then, all the side edge points are input into the data model to work out the number of all "inner points", the numbers of "inner points" in the current model and in the best model previously launched are compared through repeated iteration, and parameters of a model with the largest number of "inner points" and the number of "inner points" are recorded. The final fitted linear parameter is obtained when "the number of inner points exceeds a given number".

Any fitted side edge may be selected as the reference edge line, or parallel migration may be implemented based on any fitted side edge to obtain the reference edge line. Distances W1 and W2 between two root corners in each tab stacking region are calculated based on relative distances between the reference edge line (such a reference edge line L1) and each of the root corners A1, A2, A3, and A4 determined in step S22, and then whether the tab appearance of the cell assembly is qualified is determined. The inspection is highly accurate.

In some embodiments, alternatively, the two fitted side edges are respectively used as a first reference edge line and a second reference edge line. Based on relative distances determined between two root corners in the positive tab stacking region and the adjacent first reference edge line, distance between the two root corners in the positive tab stacking region is calculated. Based on relative distances determined between two root corners in the negative tab stacking region and the adjacent second reference edge line, distance between the two root corners in the negative tab stacking region is calculated. Accordingly, whether the tab appearance of the cell assembly is qualified is determined.

Figure 4:
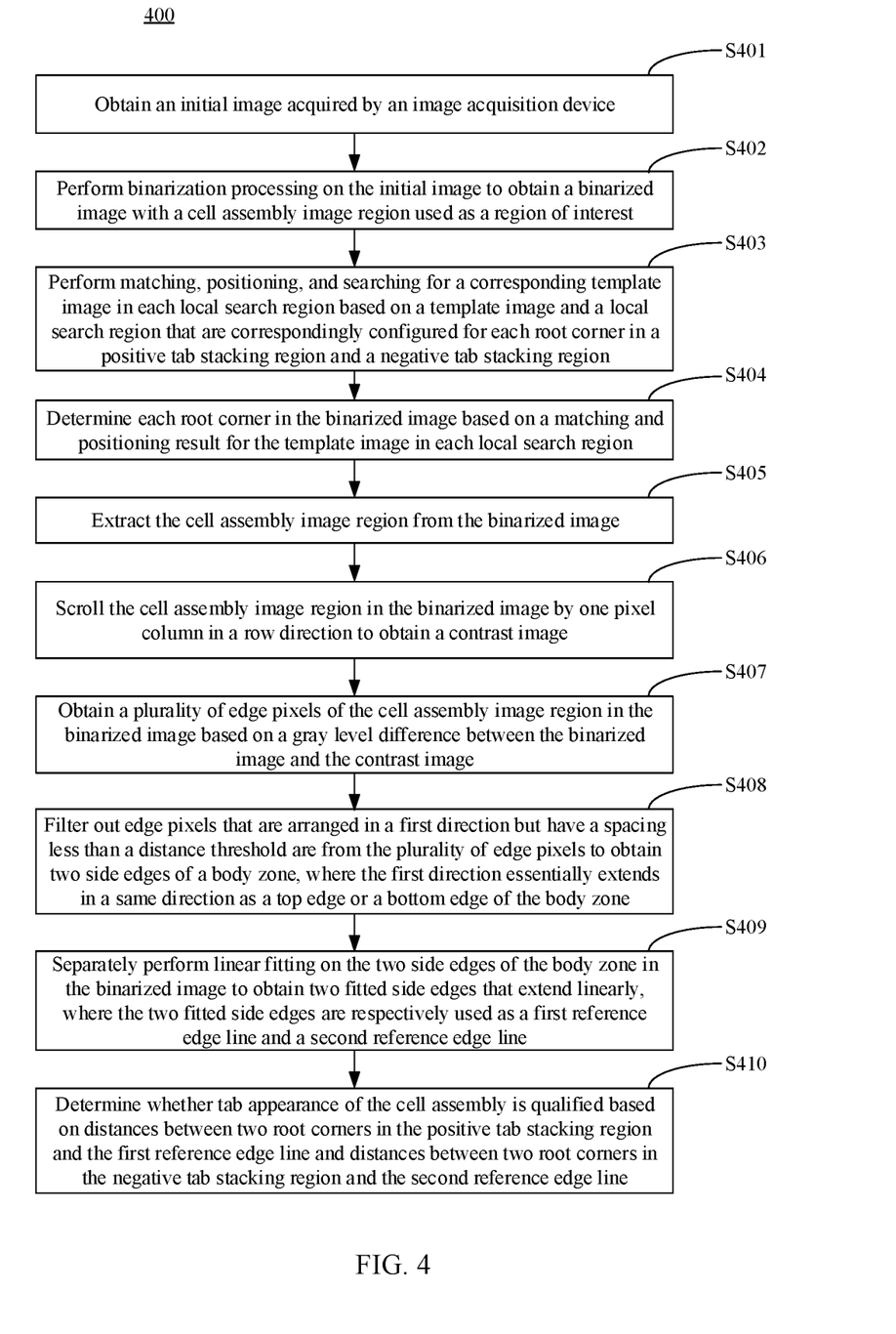
FIG. 4 is a schematic flowchart of a method for inspecting tab appearance of cell assembly according to some embodiments of this disclosure.

As shown in FIG. 4, the method for inspecting tab appearance of cell assembly according to some embodiments of this disclosure includes the following step S401 to step S410.

In step S401, an image for inspection acquired using an image acquisition device is obtained.

In step S402, binarization processing is performed on the image for inspection to obtain a binarized image with a cell assembly image region used as a region of interest.

In step S403, in the binarized image, matching, positioning, and searching is performed on a corresponding template image in each local search region based on a template image and a local search region that are correspondingly configured for each root corner in a positive tab stacking region and a negative tab stacking region.

In step S404, each root corner in the binarized image is determined based on a matching and positioning result for the template image in each local search region.

In step S405, the cell assembly image region is extracted from the binarized image based on at least one of a threshold segmentation algorithm, an image segmentation algorithm, and a maximum connected component algorithm.

In step S406, the cell assembly image region in the binarized image is scrolled by one pixel column in a row direction to obtain a contrast image.

In step S407, a plurality of edge pixels of the cell assembly image region in the binarized image are determined based on a gray level difference between the binarized image and the contrast image.

In step S408, edge pixels that are arranged in a first direction but have a spacing less than a distance threshold are filtered out from the plurality of edge pixels to obtain two side edges of a body zone, where the first direction essentially extends in a same direction as a top edge or a bottom edge of the body zone.

In step S409, linear fitting is separately performed on the two side edges of the body zone in the binarized image to obtain two fitted side edges that extend linearly, where the two fitted side edges are respectively used as a first reference edge line and a second reference edge line.

In step S410, whether tab appearance of the cell assembly is qualified is determined based on distances between two root corners in the positive tab stacking region and the first reference edge line and distances between two root corners in the negative tab stacking region and the second reference edge line.

Figure 5:
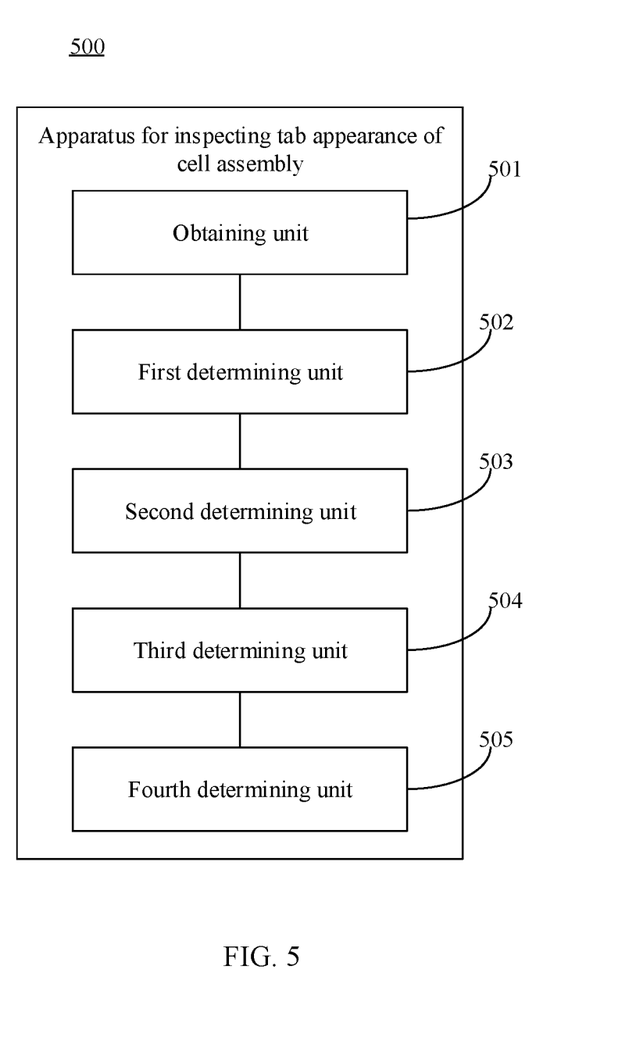
FIG. 5 is a structural diagram of an apparatus for inspecting tab appearance of cell assembly according to some embodiments of this disclosure.

As shown in FIG. 5, embodiments of this disclosure further provide an apparatus 500 for inspecting tab appearance of cell assembly. The apparatus includes: an obtaining unit 501, configured to obtain an image for inspection that includes a background region and a cell assembly image region, where the cell assembly image region includes a body zone and a plurality of tab stacking regions, each tab stacking region adjoining a top edge or a bottom edge of the body zone; a first determining unit 502, configured to determine each root corner of the plurality of tab stacking regions in the image for inspection; a second determining unit 503, configured to determine two side edges of the body zone in the image for inspection; a third determining unit 504, configured to determine at least one reference edge line in the image for inspection based on the two side edges of the body zone in the image for inspection; and a fourth determining unit 505, configured to determine result information of tab appearance inspection based on each root corner of the plurality of tab stacking regions in the image for inspection and the at least one reference edge line.

Embodiments of this disclosure further provide an electronic device including at least one processor and a memory communicatively connected to the at least one processor, where the memory stores an instruction executable by the at least one processor, and when the instruction is executed by the at least one processor, the at least one processor is caused to perform the steps of the foregoing method.

With the apparatus and electronic device in the foregoing embodiments of this disclosure, appearance inspection can be performed on stacked tabs of a cell assembly, with high inspection accuracy, thereby improving quality product rates of cell assemblies and batteries.

Embodiments of this disclosure further provide a non-transitory computer-readable storage medium storing a computer instruction, where the computer instruction is used to enable a computer to perform the method according to any one of the foregoing embodiments.

Embodiments of this disclosure further provide a computer program product that includes a computer program, where when the computer program is executed by a processor, the method according to any one of the foregoing embodiments is implemented.

In conclusion, it should be noted that the above embodiments are merely intended for describing the technical solutions of this disclosure rather than for limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this disclosure. They should all be covered in the scope of claims and specification in this disclosure. In particular, as long as there is no structural conflict, the various technical features mentioned in the embodiments can be combined in any manner. This disclosure is not limited to the specific embodiments disclosed in this disclosure, but includes all technical solutions falling within the scope of the claims.

What is claimed is:

1. A method for inspecting tab appearance of cell assembly, comprising:
    obtaining an image for inspection that comprises a background region and a cell assembly image region, wherein the cell assembly image region comprises a body zone and a plurality of tab stacking regions, each tab stacking region adjoining a top edge or a bottom edge of the body zone;
    determining each root corner of the plurality of tab stacking regions in the image for inspection;

determining two side edges of the body zone in the image for inspection;

determining at least one reference edge line in the image for inspection based on the two side edges of the body zone in the image for inspection; and determining result information of the tab appearance inspection based on each root corner of the plurality of tab stacking regions in the image for inspection and the at least one reference edge line.

2. The method according to claim 1, wherein the obtaining an image for inspection comprises:

performing binarization processing on the image for inspection to obtain a binarized image, wherein the cell assembly image region is used as a region of interest of the binarized image.

3. The method according to claim 2, wherein the determining each root corner of the plurality of tab stacking regions in the image for inspection comprises:

in the binarized image, performing matching and positioning on a corresponding template image in each local search region based on a template image and a local search region that are correspondingly configured for each root corner; and determining each root corner of the plurality of tab stacking regions in the binarized image based on a matching and positioning result for the template image in each local search region.

4. The method according to claim 2, wherein the determining two side edges of the body zone in the image for inspection comprises:

extracting the cell assembly image region from the binarized image;

scrolling the cell assembly image region in the binarized image by one pixel column in a row direction to obtain a contrast image;

determining a plurality of edge pixels of the cell assembly image region in the binarized image based on a gray level difference between the binarized image and the contrast image; and filtering out edge pixels that are arranged in a first direction but have a spacing less than a distance threshold from the plurality of edge pixels to obtain the two side edges of the body zone in the binarized image, wherein the first direction essentially extends in a same direction as the top edge and bottom edge of the body zone.

5. The method according to claim 1, wherein the obtaining an image for inspection comprises:

performing rotation correction on the image for inspection so that the top edge and bottom edge of the body zone are basically parallel to a row direction and the two side edges of the body zone are basically orthogonal to the row direction.

6. The method according to claim 1, wherein shooting exposure time for the image for inspection is not less than 8,000 microseconds and not greater than 12,000 microseconds.

7. The method according to claim 1, wherein the result information of the tab appearance inspection comprises:

distance between two root corners in each tab stacking region; and/or pass or fail assessment result for tab appearance.

8. The method according to claim 1, wherein:

the cell assembly image region comprises two tab stacking regions: a positive tab stacking region and a negative tab stacking region, wherein both the positive tab stacking region and the negative tab stacking region adjoin the top edge or bottom edge of the body zone, or the positive tab stacking region adjoins the top edge of the body zone and the negative tab stacking region adjoins the bottom edge of the body zone.

9. An electronic device comprising a memory and a processor, the memory storing a computer program, and the processor, when executing the computer program, implementing a method for inspecting tab appearance of cell assembly, the method including:

obtaining an image for inspection that comprises a background region and a cell assembly image region, wherein the cell assembly image region comprises a body zone and a plurality of tab stacking regions, each tab stacking region adjoining a top edge or a bottom edge of the body zone;

determining each root corner of the plurality of tab stacking regions in the image for inspection;

determining two side edges of the body zone in the image for inspection;

determining at least one reference edge line in the image for inspection based on the two side edges of the body zone in the image for inspection; and determining result information of the tab appearance inspection based on each root corner of the plurality of tab stacking regions in the image for inspection and the at least one reference edge line.

10. The electronic device according to claim 9, wherein the obtaining an image for inspection comprises:

performing binarization processing on the image for inspection to obtain a binarized image, wherein the cell assembly image region is used as a region of interest of the binarized image.

11. The electronic device according to claim 10, wherein the determining each root corner of the plurality of tab stacking regions in the image for inspection comprises:

in the binarized image, performing matching and positioning on a corresponding template image in each local search region based on a template image and a local search region that are correspondingly configured for each root corner; and determining each root corner of the plurality of tab stacking regions in the binarized image based on a matching and positioning result for the template image in each local search region.

12. The electronic device according to claim 10, wherein the determining two side edges of the body zone in the image for inspection comprises:

extracting the cell assembly image region from the binarized image;

scrolling the cell assembly image region in the binarized image by one pixel column in a row direction to obtain a contrast image;

determining a plurality of edge pixels of the cell assembly image region in the binarized image based on a gray level difference between the binarized image and the contrast image; and filtering out edge pixels that are arranged in a first direction but have a spacing less than a distance threshold from the plurality of edge pixels to obtain the two side edges of the body zone in the binarized image, wherein the first direction essentially extends in a same direction as the top edge and bottom edge of the body zone.

13. The electronic device according to claim 9, wherein the obtaining an image for inspection comprises:

performing rotation correction on the image for inspection so that the top edge and bottom edge of the body zone are basically parallel to a row direction and the two side edges of the body zone are basically orthogonal to the row direction.

14. The electronic device according to claim 9, wherein shooting exposure time for the image for inspection is not less than 8,000 microseconds and not greater than 12,000 microseconds.

15. The electronic device according to claim 9, wherein the result information of the tab appearance inspection comprises:
   distance between two root corners in each tab stacking region; and/or
   pass or fail assessment result for tab appearance.

16. The electronic device according to claim 9, wherein:
   the cell assembly image region comprises two tab stacking regions: a positive tab stacking region and a negative tab stacking region, wherein both the positive tab stacking region and the negative tab stacking region adjoin the top edge or bottom edge of the body zone, or the positive tab stacking region adjoins the top edge of the body zone and the negative tab stacking region adjoins the bottom edge of the body zone.

17. A non-transitory computer-readable storage medium storing a computer program, wherein the computer program, when executed by a processor of an electronic device, causes the electronic device to implement a method for inspecting tab appearance of cell assembly, the method including:
   obtaining an image for inspection that comprises a background region and a cell assembly image region, wherein the cell assembly image region comprises a body zone and a plurality of tab stacking regions, each tab stacking region adjoining a top edge or a bottom edge of the body zone;
   determining each root corner of the plurality of tab stacking regions in the image for inspection;
   determining two side edges of the body zone in the image for inspection;
   determining at least one reference edge line in the image for inspection based on the two side edges of the body zone in the image for inspection; and
   determining result information of the tab appearance inspection based on each root corner of the plurality of tab stacking regions in the image for inspection and the at least one reference edge line.

18. The non-transitory computer-readable storage medium according to claim 17, wherein the obtaining an image for inspection comprises:
   performing binarization processing on the image for inspection to obtain a binarized image, wherein the cell assembly image region is used as a region of interest of the binarized image.

19. The non-transitory computer-readable storage medium according to claim 18, wherein the determining each root corner of the plurality of tab stacking regions in the image for inspection comprises:
   in the binarized image, performing matching and positioning on a corresponding template image in each local search region based on a template image and a local search region that are correspondingly configured for each root corner; and
   determining each root corner of the plurality of tab stacking regions in the binarized image based on a matching and positioning result for the template image in each local search region.

20. The non-transitory computer-readable storage medium according to claim 18, wherein the determining two side edges of the body zone in the image for inspection comprises:
   extracting the cell assembly image region from the binarized image;
   scrolling the cell assembly image region in the binarized image by one pixel column in a row direction to obtain a contrast image;
   determining a plurality of edge pixels of the cell assembly image region in the binarized image based on a gray level difference between the binarized image and the contrast image; and
   filtering out edge pixels that are arranged in a first direction but have a spacing less than a distance threshold from the plurality of edge pixels to obtain the two side edges of the body zone in the binarized image, wherein the first direction essentially extends in a same direction as the top edge and bottom edge of the body zone.

* * * * *